April 10, 1956 W. A. MELSOM 2,741,496
FLEXIBLE HOSE COUPLING WITH ANCHORED REINFORCING LAYER
Filed June 16, 1952 3 Sheets-Sheet 1

Inventor
Walter Arthur Melsom
By
Cushman, Darby + Cushman
Attorneys

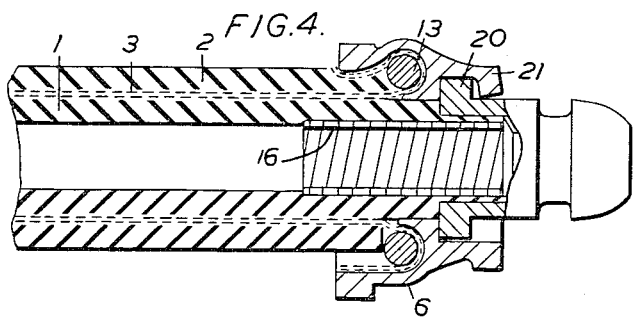
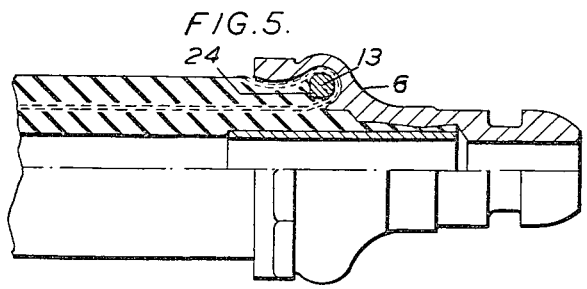
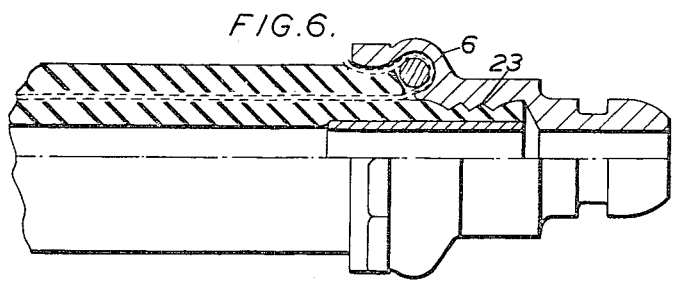
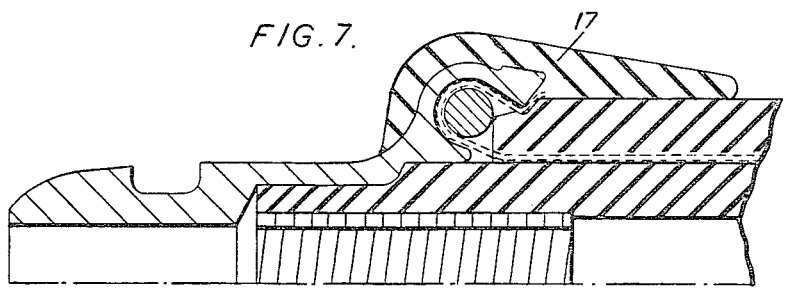

April 10, 1956 W. A. MELSOM 2,741,496
FLEXIBLE HOSE COUPLING WITH ANCHORED REINFORCING LAYER
Filed June 16, 1952 3 Sheets-Sheet 3
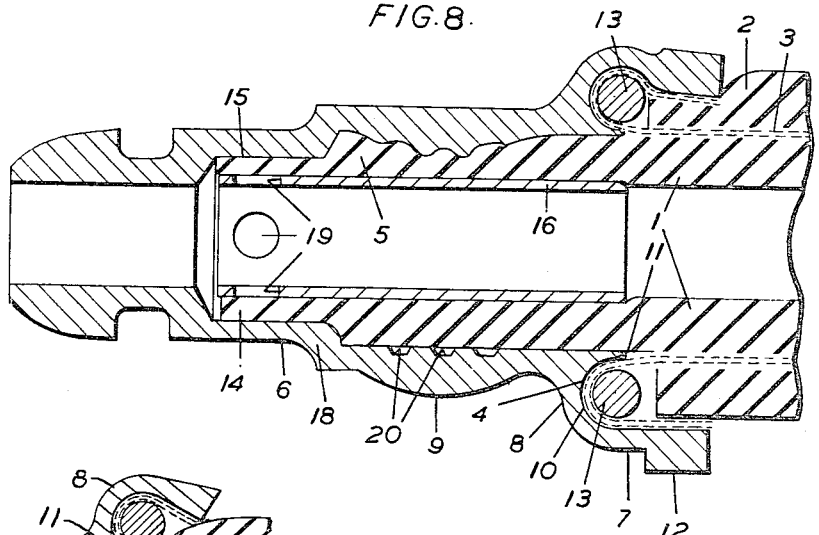
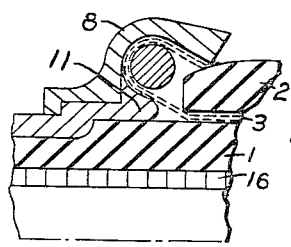
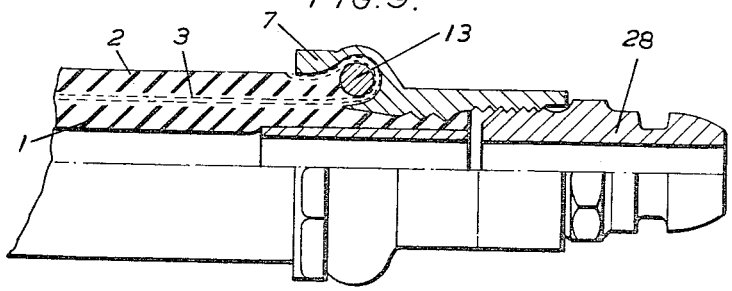

2,741,496
Patented Apr. 10, 1956

2,741,496

FLEXIBLE HOSE COUPLING WITH ANCHORED REINFORCING LAYER

Walter Arthur Melsom, Wembley Hill, Wembley, England, assignor to Bowden (Engineers) Limited, London, England Application June 16, 1952, Serial No. 293,762

Claims priority, application Great Britain June 21, 1951

15 Claims. (Cl. 285—84)

The present invention relates to improvements in flexible hose coupling components of the kind employing a flexible hose with inner and outer tubular layers of resilient material such as rubber (natural or synthetic) and a tubular layer of flexible reinforcing material embedded between them, and an end fitting by which the coupling may be connected to other apparatus. The end fitting comprises an insert fitting into the end of the hose and an outer part including an outer sleeve having a forward end wall. In order to obtain a pressure-tight fit some part of the resilient layer is gripped directly or indirectly, between the insert and the outer part. In such coupling components the hose is connected to the end fitting by direct grip of the bared reinforcing material brought about by contraction of the sleeve and the hose is sealed, or adapted by the pressure of the fluid within the hose to be sealed, to the end fitting. The reinforcing material can be flared outwards and may consist of ribbon-like groups of fine high tensile steel wires braided to tubular form. Except where otherwise stated the reinforcing layer is metal although it may have a fabric covering. The invention is applicable to coupling components suitable for use with high pressure hose, i. e., hose suitable for use with pressures above 500 lbs./sq. in. Coupling components having the above features are coupling components of the kind specified.

A powerful hold of the hose to the fitting may be secured when the reinforcing layer passes through the inside of a ring and is folded back on the outside thereof and gripped between the outer sleeve and the ring. We have found however that whilst the part of the bare material between the sleeve and the ring may be effectively gripped by contraction of the sleeve around the ring and with contraction also of the ring, the bare portion around the end of the ring and within the ring is not so gripped or so satisfactorily gripped and if that ungripped or inadequately gripped portion extends axially under working conditions the hose may be ineffectively sealed to the fitting or where a projecting portion of the inner layer of the hose forms a sealing member intended to be forced outwards strongly against its seating by the internal fluid pressure the said portion may be insufficiently supported and a burst may result. The change of angle of the wires relatively to the axis occurring in flaring out the bare material is such as to make said portion the more readily extensible axially under working conditions.

According to the method of making a hose coupling component of the kind specified by the present invention, (a) the bare end portion of the reinforcing material is passed through and folded back on the outside and extended rearwardly of a ring shaped and proportioned so that the bare material makes an easy fold following the forward surface of the ring, (b) the outer sleeve of the end fitting surrounds the ring and its end wall has an annular groove to form an inner annular rearwardly extending lip, which groove with the lip forms a surface complementary to the said forward surface of the ring, and into which groove with the lip the forward surface of the ring and the bare material folded about it intrudes, and (c) the sleeve and the rearward surface of the ring are so shaped and the sleeve so contracted inwardly that as a result of said contraction a forward thrust is exerted on the ring to cause the fold of the reinforcing material to be powerfully gripped between the complementary surfaces of the ring and the groove with the lip without inward contraction of the ring.

By "forward" or "forwardly" is meant a direction axially away from the main body of the hose and by "rearward" or "rearwardly" is meant the opposite direction. Preferably the ring at any radial cross section is circular and the complementary surface of the groove is substantially semi-circular in cross-section, save that the cross section of the ring may depart from the circle over the inward part of its rear surface which does not take part in the grip of said fold. The gripping surfaces need not be truly part circular but having regard to the nature of the metal reinforcing material the forward surface of the ring must permit the reinforcing material to follow it with an easy fold. For this and other reasons the diameter of the circular cross section must be sufficiently large. By "inward" is meant towards the axis of the coupling component, and by "outward" away from such axis.

The said rearwardly extending part of the bare material may be gripped between the sleeve and the resilient material of the body of the hose. Alternatively the ring may have a rearwardly projecting contractable extension sufficiently less in external diameter than the external diameter of the ring to enable the desired forward thrust to be given to the ring and the rearwardly extending part of the bare reinforcing material gripped between the sleeve and the said extension.

A ring of mild steel of between 28 to 35 tons per square inch tensile strength serves well. High tensile steel wires of the reinforcing material will indent such a ring and promote interlock between the ring and the said material. It is however advantageous to use a ring harder than the one mentioned, or to case-harden the ring, and interlock may then be produced between the material and the surface of the groove. Although the surface of the ring may be deformed, it must not collapse, i. e., contract inwardly. The lip supports the ring to prevent collapse. The said lip is preferably integral with the end wall, but may be a separate ring. In that case it may be of harder metal than the end wall.

Preferably the hose has an end portion of its inner resilient layer projecting beyond the outer resilient layer and an end portion of its reinforcing layer projecting beyond the outer layer and being the portion which is passed through and folded back around the ring and the end fitting provided with an extension forwardly of the sleeve and forming an internal seating for the outer periphery of the whole or part of the projecting portion of the inner layer and the said projecting portion of the inner layer being held between the insert and the said seating and serving as the means of sealing the finished coupling component. The lip extends rearwardly under the ring between the reinforcing material and the projecting portion of the inner layer and prevents harmful outward extrusion of the material of said projecting portion of the inner layer by reason of the pressure of the fluid in the hose.

Preferably the insert employed enables internal fluid under pressure in the hose of the finished coupling component to have access to the said projecting portion of the inner layer for forcing this against its seating so as to seal the coupling component at high internal fluid pressures, the whole or part of said portion being held sufficiently firmly between the insert and the seating to prevent leakage when the pressure falls. This may be achieved by contracting the extension which forms said seating sufficiently round a rigid insert which is apertured to permit fluid under pressure to have access to the said portion of the inner layer, or by employing a resilient insert such as a helical spring or a tube which is split, e. g., split collet fashion, and presses the said portion against its seating and allows the internal fluid to have the necessary access thereto.

The forward region of the said projecting portion of the inner layer may provide an annular high pressure sealing member adapted to be forced outwards by internal fluid pressure within the hose into sealing contact with the seating and between the said region and the said end wall said projecting portion may be gripped between the seating and the insert as a result of contraction of the extension, a rigid insert being employed the forward portion of which may be apertured to enable the internal fluid to have access to the sealing member. Alternatively the forward portion of the insert may be made resilient, e. g., by slotting. Such contraction of said extension may be made to force the resilient material of the forward region of the said projecting portion into firm contact with the seating and insert.

The sealing faces of the inner layer and its seating are preferably wholly or partly parallel to their common axis; the free end region of the projecting portion of the inner layer may be externally reduced to a constant smaller diameter to render it more responsive to the internal pressure, the seating being appropriately formed to co-operate with said reduced diameter region.

The contraction of the sleeve rearwardly of the ring has the tendency to tauten the bare material round the gripping region of the ring, obviating or lessening slackness in any ungripped part of the material between the gripping zone and the end face of the outer layer of the hose and interlocking the ring between the inwardly displaced part of the sleeve and the end wall.

The hose may if desired be sealed to the end fitting solely by contracting the aforesaid extension which provides the seating and gripping the projecting portion of the inner layer between the extension and the insert if this is made rigid.

The sleeve need extend over only a short length of the body of the hose and the use of a short sleeve has the advantage not only of saving metal and weight but it facilitates inspection for seeing whether or not the sealing member is in the desired axial position within the end fitting.

The invention is also applicable to coupling components in which the hose is sealed by gripping it between the sleeve and a rigid tubular insert by extending the sleeve and contracting it round the body of the hose, in which case there may or may not be a projecting portion of the inner layer.

The ring may be cut off from a metallic tube, e. g., of mild steel as aforesaid and then shaped to the desired section or by bending and joining the ends of a length of wire of the appropriate cross section.

In order that the invention may be the more readily understood, reference is hereinafter made to the constructional forms illustrated by way of example in the drawings, and in which:

Fig. 1 is a sectional elevation, the lower half of which shows the parts assembled and the upper half after the sleeve has been contracted. Figs. 2, 3 and 4 are similar views of modified forms. Figs. 5 and 6 show half in section, two forms wherein the hose is sealed to the fitting by a grip brought about by contracting a part of the end fitting. Fig. 7 shows a way of sheathing the sleeve and the adjacent end of the hose body.

Fig. 8 accompanying the present specification shows another form of coupling component. Fig. 9 is a sectional view of a further form. Fig. 10 is a detail view of a modification.

Referring to Fig. 1, the hose comprises inner and outer layers 1 and 2 respectively of resilient material (rubber, natural or synthetic) and a layer of reinforcing material 3 of the kind in which ribbon-like groups of fine high tensile steel wires are braided to tubular form. The end portion of the outer resilient layer is cut away and the end portion 4 of the reinforcing material thus externally bared, a portion 5 of the inner resilient layer projecting forwardly beyond the end of the outer layer.

The outer part of the metal end fitting comprises a member 6 providing a sleeve 7 with an end wall 8 and an extension 9 from the end wall in a direction opposite to the sleeve. The end wall is grooved at 10 to approximately half-circular profile, forming an inner annular rearwardly-extending lip 11. The sleeve is provided with an integral external band 12 at its end remote from the end wall. (This band may be formed by a separate ring if desired.) A ring 13 is provided of circular section metal arranged so that it may be brought substantially concentric with the half-circular section groove 10.

The end portion 4 of the reinforcing material is separated from the projecting portion 5 of the inner resilient layer and is folded round the ring 13.

The projecting portion 5 of the inner layer is intended to act as a cylindrical sealing member by engaging with a seating surface 14 formed by the inner peripheral surface of the extension 9. This seating surface is stepped by means of the radiussed shoulder 15 and the sealing member is likewise stepped and shouldered.

A spring insert 16 is introduced into the sealing member and some way into the body of the hose and it is energised so as to hold the sealing member firmly against its seating when there is a low pressure or no pressure of fluid in the hose, whilst allowing the fluid to pass between the convolutions of the spring and press the sealing member more firmly against its seating at high internal pressures.

The sealing surface of the sealing member is ground to a desired degree of smoothness and to enable this to be effected, the separate end portion 4 of the reinforcing material is folded round the ring 13 and held by a suitable tool so that the grinding tool can operate on the sealing member over its smaller external diameter and if desired over as much of its larger diameter as possible. It will be observed that the sealing member can be very satisfactorily exposed for grinding.

When the sealing member has been prepared and the tool removed (the stepped seating surface will have been prepared to enable sealing contact to be effectively made with it) the member 6 is forced over the sealing member and the sleeve 7 over the flared bared material 4, and the sleeve forced home as shown in the lower half of the figure. The swaging band 12 lies round the end portion of the outer layer 2, the forward face of which contacts or lies close to the ring 13. The swaging band is now contracted and in closing inwards it brings the extreme portion of the bared reinforcing material extending beyond the gripping zone into contact with the outer layer of the hose, draws the bared reinforcing material around the ring and exerts a forward thrust on the ring causing its forward surface to press the reinforcing material powerfully against the complementary surface of the groove 10 to produce the said gripping zone where a powerful grip of the reinforcing material around its fold is produced. Only a short length of taut reinforcing material is left under the ring between the embedded portion of such material and the gripping zone where it is strongly clamped between the ring and the surface of the groove, and the lip 11 and the ungripped reinforcing material supports the inner layer when forced out by the internal pressure so that there is continuous support for the inner layer where it is separated from the reinforcing material. The lip prevents outward extrusion of the inner layer in a region where damage to such layer might result. It also provides support for the ring to prevent collapse.

In the form shown in Fig. 2 instead of the swaging band 12 the end 18 of the sleeve is turned or rolled in by any appropriate spinning, pressing or rolling tool.

Fig. 3 shows a modification in which the ring 13 has a rearward extension 19, the inner diameter of which is substantially that of the ring and the external diameter of which is sufficiently less than that of the ring to enable the sleeve to close in behind the ring and exert the desired forward thrust thereon. In this form, the extreme end of the bared material extending rearwardly beyond the gripping zone between the ring and the groove, is gripped between the sleeve and the extension 19 and the said extension is contracted sufficiently to press the reinforcing material under it against the inner layer of the hose.

In each of the forms before described, the extension 9 of the member 6 is formed as a sealing nipple adapted rotatably to support a union nut, e. g., in the manner described and claimed in my prior Patent No. 2,310,490 but the fitting may be adapted for coupling to a companion member by screwing or any other suitable way. The nipple, screw or other means of connection need not be an integral part of the member carrying the sleeve, e. g., it may be a separate part secured as shown in Fig. 4, i. e., having a collar 20 held in position by swaging in the end portion 21 of the member 6. It may also be attached to the insert or a composite end fitting in which the insert and the outer part are integral.

Figs. 5 and 6 show the invention applied to a coupling component in which the hose is sealed by a grip brought about by contracting a portion of the outer part of the end fitting, producing thereby a seal which is effective even at negative pressure. Referring to Fig. 5 the end portion of the inner layer projects and is externally ground before assembly of the sleeve, to act as a sealing member, but the spring is replaced by a rigid tubular insert 22 and a portion of the member 6 around the sealing member is contracted sufficiently to grip the sealing member between that portion of the member 6 and the insert and produce an effective seal. In Fig. 6 the sealing member is left unground and the internal wall of the member 6 is ribbed or serrated at 23 and swaged inwards. The inner crests of the ribs localise the pressure on the resilient material and displace the said material sufficiently to cause it to mould itself to the ridges and produce an effective seal even though the initial sealing surface of the resilient material is uneven due to the reinforcing material having embedded into it before it was turned back around the ring. The crests of the ribs may be flat or curved instead of being sharp as shown.

Fig. 5 also shows a modified cross-section of the ring in which the approximately 90° portion of the ring remote from the end wall is left with sides making 90° to one another, e. g., as it has been cut from the tube. The ring fits snugly against the end face 24 of the outer resilient layer. This feature may obviously be applied to the forms shown in Figs. 1 to 4.

The inserts shown in Figs. 5 and 6 may be and preferably are apertured to allow the internal fluid under pressure in the hose to press the sealing member more strongly on its seating.

Fig. 7 shows how a sheath 17 may be finally fitted over the member 6 to lie around the peripheral wall and against the end wall of the sleeve and around the body of the hose. The sheath may be made of rubber or other suitable material, if desired metal. The sheath may be employed to seal off the outer wall of the hose with the sleeve and prevent any projection of the bare reinforcing material. It may be made of a suitable fire or high temperature resisting medium. It also gives a finished appearance to the coupling component.

In Fig. 8 the forward region of said projecting portion of the inner layer is intended to provide an annular high pressure sealing member 14 adapted to be forced outwardly by internal fluid pressure within the hose into sealing contact with a seating 15 provided by the said extension, and the said extension in the region between the said seating and the said end wall 8 is contracted to grip the inner layer between the extension and an insert 16 located in the bore of the hose. The forward region aforesaid of the inner layer is made of reduced external diameter compared with the region between the seating and the end wall and the extension is shouldered internally and externally at 18. The sealing surface of the sealing member and the seating surface are parallel to their common axis. The insert lies within the two regions of the projecting portion of the inner layer and has a circumferential series of holes 19 where it lies within the sealing member 14. The internal periphery of the region of the extension intended to be contracted has a number of annular grooves 20.

Fig. 9 shows another form of coupling component with an end piece 28 which may be screwed to the component at any convenient time during assembly and by the aid of which the end of the component may be left open for ascertaining that the rest of the parts are correctly assembled. This form may have a spring insert and promotes the use of a more heavily loaded spring.

Fig. 10 shows a form in which the lip 11 is not integral with the end wall but is a separate ring.

Figure 1:
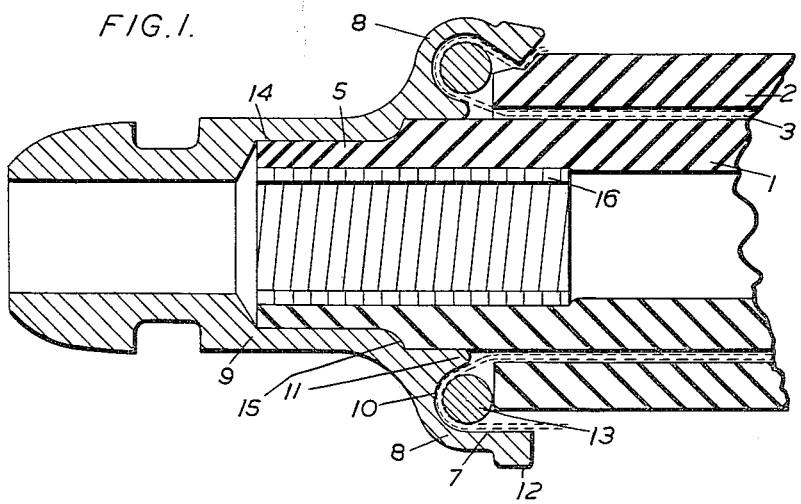
Figure 2:
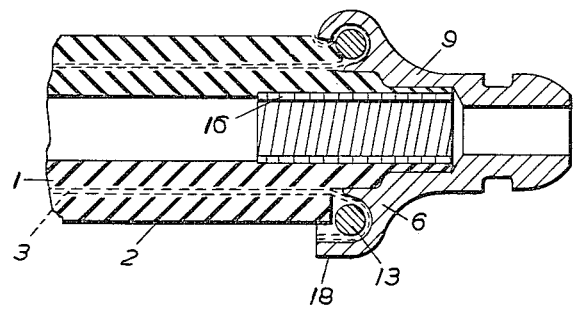
Figure 3:
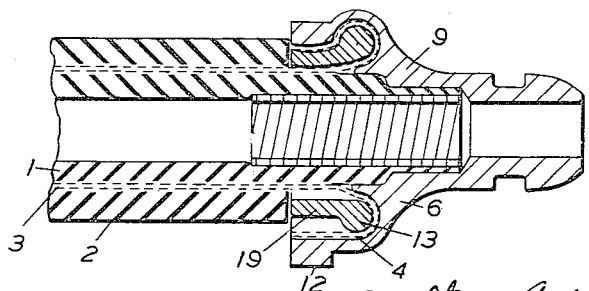

The hose may have a fabric reinforcing layer instead of a metallic or fabric covered metallic layer, if one or both of the gripping faces be of a material which will grip it without damage, e. g., if the ring be made of brass or other metal suitably softer than the sleeve or if the recess be lined or otherwise provided with a separate ring member of appropriate material.

The sleeve need not have an enlarged swaging band, e. g., it may be of uniform wall thickness.

When it is stated that the reinforcing layer is bare, it is intended to include constructions in which there is on the layer a contiguous fabric cover or a layer of rubber so thin that when gripping takes place it is substantially entirely forced into the interstices of the reinforcing layer.

Where such fabric material is present, we prefer however to remove it so that the metal is directly gripped.

If the hose has inner and outer resilient layers, two or more reinforcing layers and one or more intervening resilient layers, preferably the inner reinforcing layer is exposed and gripped between the sleeve and the ring, the outer reinforcing layer(s) and the intervening and outer resilient layers being removed. Alternatively, the outer reinforcing layer is exposed and gripped between the sleeve and the ring, the intervening resilient layer(s) and the inner reinforcing layer(s) being removed to expose a projecting portion of the inner resilient layer to form a sealing member.

When it is stated that the outer sleeve is contracted it is meant that it is of such metal, and is subjected to such pressure that a permanent deformation is produced; suitable metals are brass, aluminum, mild steel and Phosphor-bronze.

What I claim is:

1. A hose coupling component having a flexible hose with tubular layers of resilient material and tubular flexible reinforcing material embedded between them and an end fitting comprising an insert fitting into the end of the hose and an outer part including an outer sleeve having a forward end wall wherein (a) the end portion of the reinforcing material of the resilient material is passed through and folded back on the outside and extended rearwardly of a ring shaped and proportioned so that the bare material makes an easy fold following the forward surface of the ring, (b) the outer sleeve of the end fitting surrounds the ring and its end wall has an annular groove with an inner annular rearwardly-extending lip, which groove with the lip forms a surface complementary to the said forward surface of the ring into which groove with the lip the forward surface of the ring and the bare material folded about it intrudes, (c) the sleeve has been contracted inwardly behind the ring and as a result of said contraction and cooperation with the rearward surface of the ring has caused a forward thrust to be exerted on the ring whereby the fold of the reinforcing material is powerfully gripped between the complementary surfaces of the ring and the groove with the lip without inward contraction of the ring and (d) the resilient material of the hose provides a sealing means for sealing the hose to the end fitting.

2. A hose coupling component having a flexible hose with tubular layers of resilient material and tubular flexible reinforcing material embedded between them and an end fitting comprising an insert fitting into the end of the hose and an outer part including an outer sleeve having a forward end wall wherein (a) the end portion of the reinforcing material bare of the resilient material is passed through and folded back on the outside and extended rearwardly of a ring which is circular in cross section at any radial section at least over its forward surface so that the bare material makes an easy fold following the said forward surface of the ring, (b) the outer sleeve of the end fitting surrounds the ring and its end wall has an annular groove with an inner annular rearwardly-extending lip, which groove with the lip forms a surface complementary to the said forward surface of the ring and into which groove with the lip the forward surface of the ring and the bare material folded about it intrudes the inner resilient layer projecting forwardly under the lip and being held between the insert and a forward extension of said sleeve and serving as a sealing member, and (c) the outer part of the rearward surface of the ring is directed rearwardly and inwardly and the sleeve has been contracted inwardly therearound and caused a forward thrust to be exerted on the ring whereby the fold of the reinforcing material is powerfully gripped between the complementary surfaces of the ring and the groove with the lip without inward contraction of the ring.

3. A hose coupling component according to claim 2 in which the ring is circular in cross section at any radial section at least over its forward surface behind which the sleeve has been contracted and the outer part of its rearward surface.

4. A hose coupling component according to claim 1 in which the said rearwardly extending part of the bare material is gripped between the sleeve and the body of the hose.

5. A hose coupling component according to claim 1 in which the ring has a rearward extension sufficiently less in external diameter than the external diameter of the ring to enable the desired forward thrust to be given to the ring and the said rearwardly extending part of the material is gripped between the sleeve and said extension which is contracted as a result of contracting the sleeve.

6. A hose coupling component according to claim 1 in which the lip is not integral with the end wall but is a separate ring.

7. The hose coupling component according to claim 1 in which sealing is effected by the body of the hose being gripped between the sleeve and the insert by contraction of the sleeve, at least the portion of the insert taking part in this grip being rigid.

8. The hose coupling component according to claim 1 in which the reinforcing material is metallic.

9. The hose coupling component according to claim 1 in which the reinforcing layer is fabric and at least one of the gripping surfaces is of material sufficiently soft to grip it without damage.

10. The hose coupling component according to claim 1 in which the gripping surface of the groove is formed by a lining thereof.

11. A hose coupling component according to claim 1 in which the hose has an end portion of its inner resilient layer projecting beyond the outer resilient layer, said outer part of the end fitting having an extension providing an internal seating for the outer periphery of at least part of the said projecting portion of the inner resilient layer, and in which there is a forward region of the insert and the forward region of the said projecting portion of the inner layer surrounding said region of the insert is adapted to be pressed into contact with the said seating by internal pressure and a region of said projecting portion between the forward region and the outer layer of the hose is gripped between the said extension of the end fitting and the insert by contracting the extension.

12. A hose coupling component according to claim 11 in which the said forward region of the insert is apertured.

13. A hose coupling component according to claim 1 in which the hose has an end portion of its inner resilient layer projecting beyond the outer resilient layer, said outer part of the end fitting providing an internal seating for the outer periphery of at least part of the said projecting portion of the inner resilient layer, and in which at least the forward region of the insert is resilient and the forward region of the projecting portion of the inner layer surrounding said region of the insert is pressed into contact with the seating by said resilient portion and is adapted to be pressed more strongly into contact with the seating by internal fluid pressure and a region of said projecting portion between the forward region and the outer layer of the hose is gripped between the said outer portion of the end fitting and the insert.

14. A hose coupling component according to claim 1 in which the hose has an end portion of its inner resilient layer projecting beyond the outer resilient layer, said outer part of the end fitting having an internal seating for the outer periphery of at least part of the said projecting portion of the inner resilient layer, and in which the free end region of the said projecting portion of the inner layer is externally reduced to a constant smaller diameter to render it more responsive to the internal pressure, the seating being appropriately formed to co-operate with the said reduced diameter region.

15. A hose coupling component according to claim 1 in which the hose has an end portion of its inner resilient layer projecting beyond the outer resilient layer said outer part of the end fitting having extension providing an internal gripping wall for the outer periphery of at least part of said projecting portion of the inner resilient layer, and in which the said gripping wall of the said extension is annularly ribbed so that the contraction of the extension creates high pressure regions under the rib or ribs and causes the resilient material to mould itself thereto and provide efficient sealing despite any irregularities in the surface of the resilient material before contraction.

References Cited in the file of this patent

UNITED STATES PATENTS

| | | |
|---|---|---|
| 213,577 | Kennedy | Mar. 25, 1879 |
| 1,926,270 | Eastman | Sept. 12, 1933 |
| 2,610,869 | Allison | Sept. 16, 1952 |